(12) United States Patent
Nice et al.

(10) Patent No.: US 8,312,273 B2
(45) Date of Patent: Nov. 13, 2012

(54) PRIVACY VAULT FOR MAINTAINING THE PRIVACY OF USER PROFILES

(75) Inventors: Nir Nice, Kfar Veradim (IL); Melissa W. Dunn, Woodinville, WA (US); Eric Picard, Redmond, WA (US); Amit Shaked, Netanya (IL); Eric Don Van Valkenburg, Redmond, WA (US); Alexander George Gounares, Kirkland, WA (US); Friedman Arie, Petach Tikva (IL); Sefy Ophir, Tel Mond (IL); Boaz Feldbaum, Haifa (IL); Vu A. Ha, Kirkland, WA (US); Teresa B. Mah, Bellevue, WA (US); Darrell Jay Cannon, Sammamish, WA (US); Michael Joseph Toutonghi, Prague (CZ); Uri Barash, Tel Mond (IL); Cynthia Dwork, San Francisco, CA (US); Ying Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 12/575,260

(22) Filed: Oct. 7, 2009

(65) Prior Publication Data

US 2011/0083013 A1 Apr. 7, 2011

(51) Int. Cl.
*H04L 9/32* (2006.01)
(52) U.S. Cl. .............................. 713/168; 713/150; 726/4
(58) Field of Classification Search .................. None
See application file for complete search history.

(56) References Cited

U.S. PATENT DOCUMENTS 7,068,787 B1 * 6/2006 Ta et al. ..................... 380/240
2003/0065670 A1 4/2003 Bisson et al.
(Continued)

FOREIGN PATENT DOCUMENTS

KR 1020090090032 A 8/2009

OTHER PUBLICATIONS

PCT Notification of Transmittal of the International Search Report and the Written Opinion of the International Searching Authority, or the Declaration, International Application No. PCT/US2010/051625, International Filing Date: Oct. 6, 2010, Applicant: Microsoft Corporation.

(Continued)

*Primary Examiner* — Fikremariam A Yalew
(74) *Attorney, Agent, or Firm* — Shook Hardy & Bacon LLP (57) ABSTRACT

Methods, systems, and computer-readable media for facilitating personalization of web content is provided, while protecting the privacy of the user data utilized to personalize the user's experience. A privacy vault may collect user data including user activity data, demographic data, and user interests submitted by a user. In one embodiment, the privacy vault operates on a user client device. The privacy vault sends the user data to a community vault that collects user data from multiple users. The community vault generates segment rules that whether a user belongs to a user segment, which expresses a user's interest. The segment rules are then communicated back to the privacy vault, which assigns one or more user segments to the user based on the user data available to the privacy vault and the segment rules. The privacy vault may communicate user segments to one or more content providers that supply personalized content that is selected based on the user segments provided.

18 Claims, 6 Drawing Sheets

U.S. PATENT DOCUMENTS

| | | | |
|---|---|---|---|
| 2005/0165911 A1* | 7/2005 | Homiller | 709/219 |
| 2009/0024546 A1 | 1/2009 | Ficcaglia | |
| 2009/0037279 A1 | 2/2009 | Chockalingam et al. | |
| 2009/0132366 A1 | 5/2009 | Lam et al. | |
| 2009/0234708 A1 | 9/2009 | Heiser, II et al. | |
| 2010/0100419 A1* | 4/2010 | Natoli et al. | 705/10 |

OTHER PUBLICATIONS

Nicola Henze and Daniel Krause, "User Profiling and Privacy Protection for a Web Service oriented Semantic Web," Distributed Systems Institute, Semantic Web Group, University of Hannover, AppelstraBe 4, 30167 Hannover, Germany, 5 pages, {krause,henze}@kbs.uni-hannover.de, http://www.daniel-krause.org/publications/abis06.pdf, 2006.

Takeshi Okuda, Susumu Takeuchi, Takahiro Miyamoto, Kaname Harumoto, and Shinji Shimojo, "Unified Architecture for Managing User Profiles," IEEE Computer Society, Proceedings of the the 2005 Symposium on Applications and the Internet Workshops (SAINT-W'05), 0-7695-2263-7/05—2005 IEEE, 4 pages, http://ieeexplore.ieee.org/stamp/stamp.jsp?arnumber=01620009.

GME Vault, "Privacy Statement," Aug. 5, 2009, Copyright 2007-2009 University of Iowa Graduate Medical Education: Terms of Use, Privacy Statement, 2 pages, http://gmevault.healthcare.uiowa.edu/portal/VaultLogin/tabid/586/etl/Privacy/Default.aspx.

Tatiana Kovacikova, Francoise Petersen, Mike Pluke, Valentin Alonso, Alvarez, Giovanni Bartolomeo, Antonella Frisiello, Erik Zetterstrom, and Scott Cadzow, ETSI STF 342[1], European Telecommunications Standards Institute, Sophia Antipolis, France, 6 pages, http://www.ist-sms.org/Documents/C23.pdf, Jan. 20, 2009.

BEA, e-docs.bea.com, Weblogic Portal 7.0, "Introduction to WebLogic Portal Development," BEA Systems: How Business Becomes E-Business, Copyright BEA Systems Inc: All rights reserved, 5 pages, http://e-docs.bea.com/wlp/docs70/dev/devintro.htm, Aug. 5, 2009.

Wolfgang Woerndl, (woerndl@in.tum.de), Technische Universitat Munchen, Munich, Germany, "Using P3P to Negotiate Access Rights to User Profiles," Sep. 2001, 3 pages, http://www.w3.org/2002/p3p-ws/pp/tu-munich.html.

* cited by examiner

PRIVACY VAULT FOR MAINTAINING THE PRIVACY OF USER PROFILES

BACKGROUND

Websites may display advertisements or other content that is targeted to a user based on a user segment assigned to the user. A user segment defines one or more areas of interest for the user. The user segments may be generated based on a statistical analysis of user behaviors.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention facilitate a personalized online experience based on user interests, while protecting the privacy of the user data utilized to personalize the user's experience. A privacy vault may collect user data including user activity data, demographic data, and user interests submitted by a user. In one embodiment, the privacy vault operates a user client device. The privacy vault sends the user data to a community vault that collects user data from multiple users. The community vault generates segment rules for creating user segments. A user segment expresses a user's interests. The segment rules are then communicated back to the privacy vault, which uses the segment rules and user data available to the privacy vault to determine into which segments the user belongs. The privacy vault may communicate the user segments to one or more content providers that supply personalized content that is selected based on the user segments provided.

BRIEF DESCRIPTION OF THE DRAWINGS

Embodiments of the invention are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention facilitate a personalized online experience based on implicitly calculated and/or explicitly specified user interests, while protecting the privacy of the user data utilized to personalize the user's experience. A privacy vault may collect user data including user activity data, demographic data, and user interests submitted by a user. User activity data includes URLs visited, search queries, desktop search activities, viewed programs, downloaded music, music listened to, etc. In one embodiment, the privacy vault operates on a user's client device. The privacy vault sends the user data to a community vault that collects user data from multiple users. The community vault generates segment rules that may be used to associate an individual user with a user segment. The segment rules are then communicated back to the privacy vault, which assigns one or more user segments to the user based on the user data available to the privacy vault and the segments rules associated with the user segments. The privacy vault may communicate the user segments to one or more content providers that supply personalized content that is selected based on the user segments provided.

Accordingly, in one embodiment, one or more computer-readable media having computer-executable instructions embodied thereon for performing a method of providing a personalized online experience are provided. The method includes collecting, at a computing device, user data for an individual user. The method also includes transmitting at least a portion of the user data to a community vault. The community vault receives a combination of user data from multiple users and generates segment rules associated with user segments based on the combination of user data. An individual user segment describes interests of a generic user associated with the individual user segment, and wherein a segment rule defines criteria that are used to determine whether the generic user belongs to the individual user segment. The method also includes receiving one or more segment rules from the community vault. The method also includes assigning a specific user segment to the individual user based on the one or more segment rules and the user data and communicating the specific user segment to a content provider. The method further includes receiving personalized content based on the specific user segment.

In another embodiment, a method of generating segment rules for user segments that are used to select a personalized content for a user is provided. The method includes receiving user data from a plurality of privacy vaults associated with different individual users. The method also includes generating segment rules for a plurality of user segments based on the user data. An individual user segment includes segment rules that are used to determine whether a user should be associated with a particular user segment. The individual user segment describes a user interest. The method also includes communicating one or more of the plurality of segment rules to at least one of the plurality of privacy vaults.

In yet another embodiment, a computerized system for maintaining user privacy while facilitating a personalized online user experience for a user of the system is provided. The system includes a privacy vault that runs on a computing device associated with the user. The privacy vault includes a primary data collector that collects first-hand user data through analysis of user activities performed through the computing device. The privacy vault also includes a satellite data collector interface that receives supplemental user data collected by one or more satellite data collectors running on other computing devices associated with the user. The first-hand user data and the supplemental user data is collectively referred to as user data. The privacy vault also includes a community vault interface for communicating the user data and the supplemental user data to a community vault that operates on a different computer and generates segment rules based on the user data and additional user data associated with additional users. The privacy vault also includes a segment distribution component that communicates a user segment that the privacy vault has determined to be associated with the user, to a content provider, wherein the content provider provides content based on the user segment.

Having briefly described an overview of embodiments of the invention, an exemplary operating environment suitable for use in implementing embodiments of the invention is described below.

Exemplary Operating Environment

Figure 1:
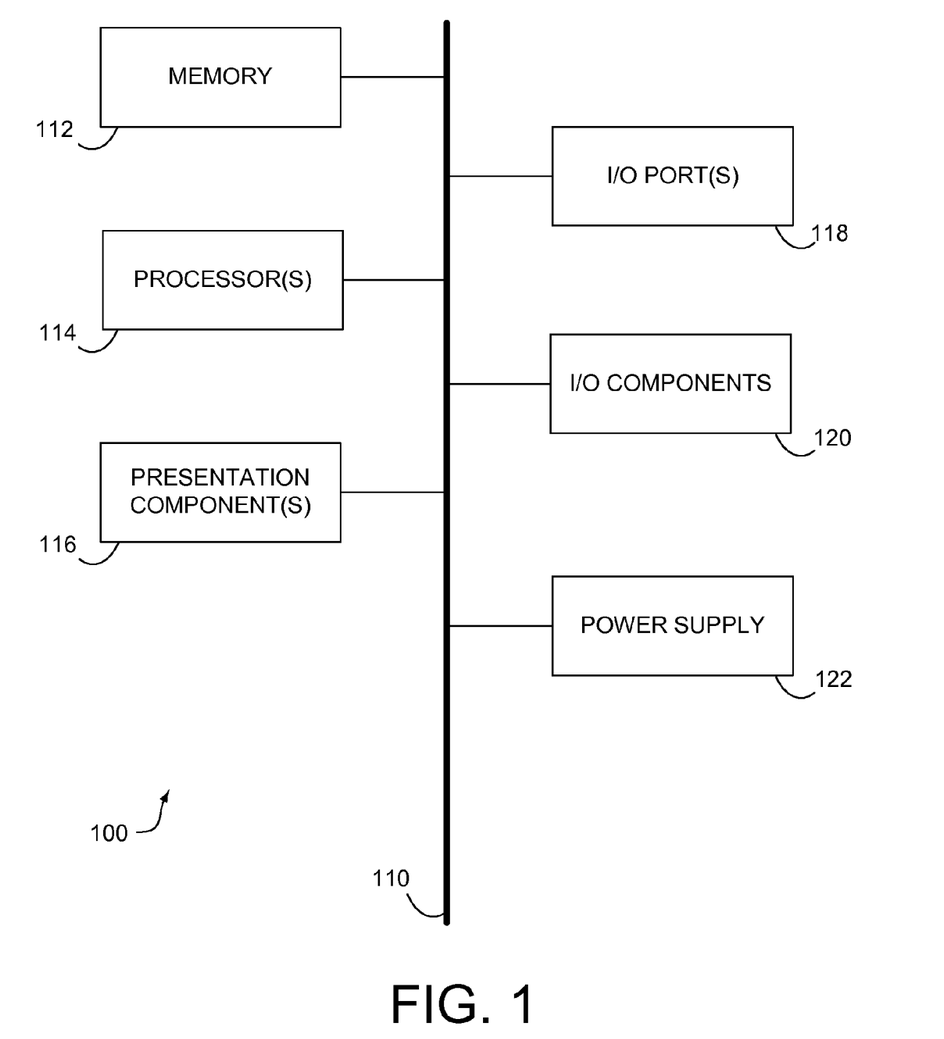
FIG. 1 is a block diagram of an exemplary computing environment suitable for implementing embodiments of the invention.

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120t. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-readable media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary System Architecture

Figure 2:
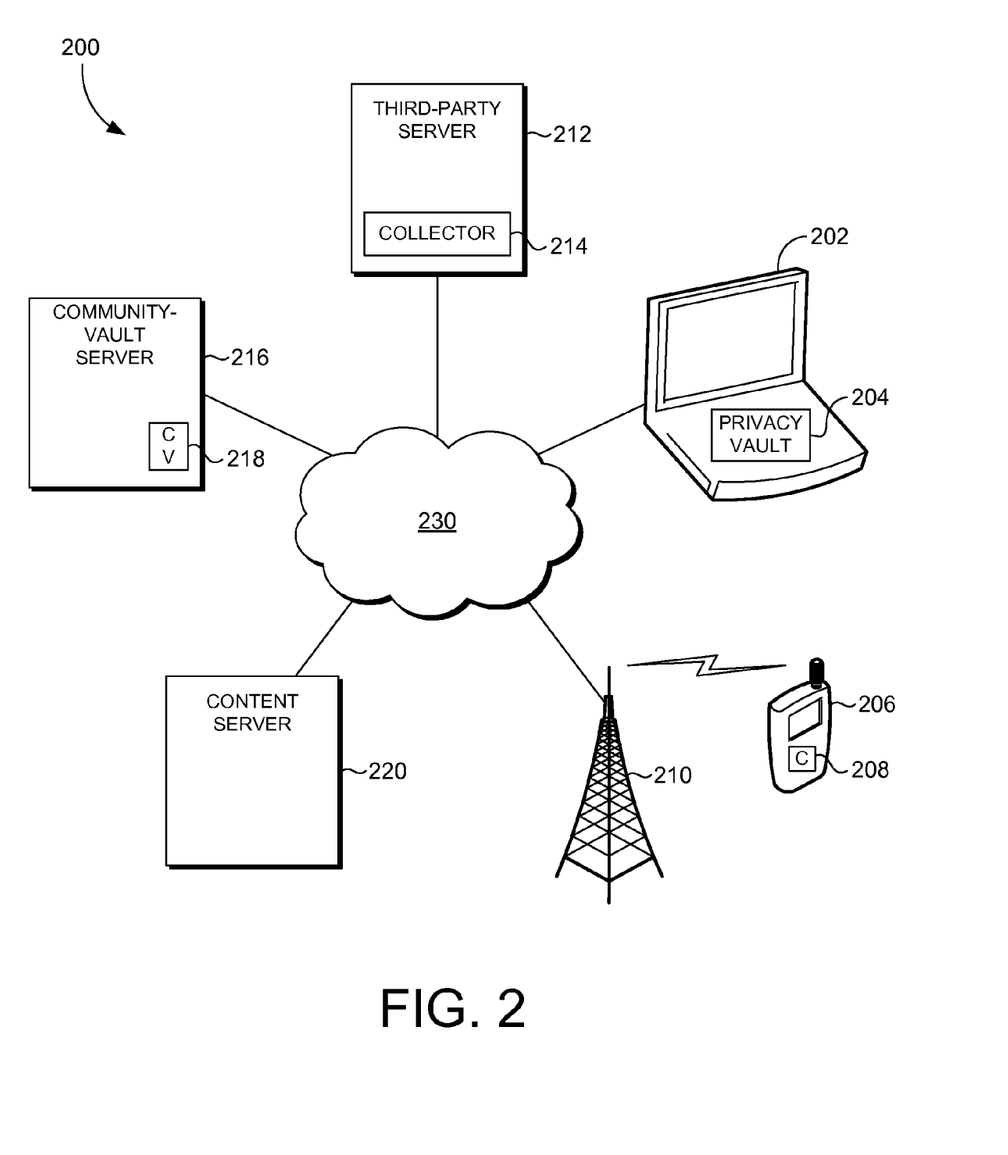
FIG. 2 is a diagram of an illustrative operating environment suitable for implementing embodiments of the invention.

Embodiments of the present invention may be practiced in a communications network providing service to devices communicatively coupled to the communications network. An illustrative operating environment 200 that contains a few of the components within such a communications network is shown in FIG. 2. Illustrative operating environment 200 includes a laptop comp 202, privacy vault 204, a mobile device 206, a satellite collector 208, a base station 210, a third-party server 212, a third-party collector 214, a community-vault server 216, a community vault 218, a content server 220, and a network 230. The components shown in FIG. 2 are a few of the components that embodiments of the invention may interact with during operation. The components shown in FIG. 2 are described in brief and with an emphasis on function for the sake of simplicity. The components within FIG. 2 are communicatively coupled to each other in a manner appropriate for carrying out their respective function within the illustrative operating environment 200. Embodiments of the present invention are not limited by the communication protocols or formats used to facilitate communications between components; those mentioned are for the sake of enablement and are not meant to be limiting.

The laptop 202 may be similar to computing device 100 described previously with reference to FIG. 1. The privacy vault 204 is an application running on the laptop 202. The privacy vault 204 is an application that collects the user data, assigns one or more user segments to the user of the laptop 202, and communicates the user segments to content providers, such as content server 220, which in turn provide personalized information based on the user segments provided by the privacy vault 204. The privacy vault may communicate the user data to a community vault, such as community vault 218. The community vault may generate segment rules for user segments by aggregating the user data from multiple users. The segments rules may be generated based on a statistical analysis of the user data. The privacy vault 204 may receive segment rules from the community vault 218. As stated, the privacy vault 204 may then assign one or more of the segments to the user of laptop 202 based on the segment rules.

The laptop 202 may have several users. When multiple users are using a single computing device, such as laptop 202, the privacy vault 204 may collect information and assign user segments to individual users of the laptop 202. Individual users may need to log in, or otherwise be associated with their user profile, so that each user can be associated with different user segments based on the individual user's data. Embodiments to the present invention are not limited to use on a laptop 202; the privacy vault 204 may operate on any suitable computing device. The privacy vault 204 will be explained in more detail with reference to FIG. 3.

Mobile device 206 is depicted as a wireless communications device communicating over an air interface with base station 210. Mobile device 206 is a wireless terminal that is adapted to receive communications and media over the wireless networks included in illustrative operating environment 200. Some lower-level details of mobile device 206 are not shown so as to not obscure embodiments of the present invention. For example, mobile device 206 may include a bus that directly or indirectly couples the following devices: memory; one or more processors; one or more presentation components such as a display or speaker; input/output (I/O) ports; I/O components; and a power supply such as a battery. Mobile device 206 may communicate via wireless protocols, such as code division multiple access ("CDMA"), global system for mobile communications ("GSM"), or time division multiple access ("TDMA"), as well as others, to communicate with base station 210.

Mobile device 206 may take on any of a variety of forms. By way of example, mobile device 206 may be a mobile telephone, smart phone, laptop computing device, desktop computing device, server, personal digital assistant ("PDA") or any combination of these or other devices. Mobile device 206 is capable of accessing content over the Internet. Examples of content that may be received include text messages, multimedia messages, emails, calendar updates, web pages, videos, pictures, and task reminders.

The mobile device 206 may be associated with a user. For example, a text message sent to mobile device 206 would be intended for the user. The user is the ultimate recipient of communications (e.g., emails, phone calls, text messages) and media content sent to mobile device 206.

The satellite collector 208 collects user data from mobile device 206. The user data may include online activity and demographic data. The satellite collector 208 transmits the user data to the privacy vault 204 operating on the laptop 202. In this case, both the laptop 202 and the mobile device 206 are associated with the same user. Thus, the satellite collector 208 helps collect user information that may be compiled by the privacy vault 204 to better understand the user's interests and needs. In one embodiment, the user registers individual devices with the privacy vault 204. Various attributes of a registered mobile device may be collected to allow the satellite collector 208 and the privacy vault 204 to communicate with each other. The user may be able to adjust the privacy settings for the satellite collector 208. The user may have different privacy settings for collectors on different devices. The user segments that are associated with the user in the privacy vault 204 may be distributed to the different devices. Satellite privacy vaults on the different devices may use or distribute the user segments to content provider with which the different devices interact.

Base station 210 is a fixed station used for communicating with mobile device 206. Standard air interface protocols, such as code division multiple access ("CDMA"), global system for mobile communications ("GSM"), or time division multiple access ("TDMA"), as well as others, may be used by base station 210 to communicate with mobile device 206. Other network communications interface arrangements are also possible. A base station controller (not shown) is responsible for handling traffic and signaling with mobile device 206. Only one base station 210 is shown, and without its many components, for the sake of clarity. Mobile device 206 could be in simultaneous communication with multiple base stations.

The third-party server 212 is a server performing functions on behalf of a third party. Examples of suitable third parties include on-line retailers, travel agencies, off-line retailers, banks, e-banks, e-commerce sites, and credit card companies. The third party may be any entity that interacts with the user of laptop 202. In one embodiment, the third-party server 212 has access to information describing the user's purchases. As stated, these may be on-line or off-line purchases. For example, a grocery store may have information describing a particular user's purchases. The user may give permission for the third party to submit the user data to the privacy vault 204.

The third-party collector 214 collects information from the third-party server 212 that describes the user's activities. The third-party collector 214 communicates this user data to the privacy vault 204. As stated, user data provided by the third-party collector 214 may include purchase information or other financial information related to the user's interests and activities.

The Community vault server 216 may be a computing device similar to computing device 100 described previously. The community vault server 216 operates a community vault application 218, which interacts with privacy vaults, such as privacy vault 204, to generate and share segment rules associated with user segments. The user data may be sent to the community vault 218 from privacy vaults. The user data is received and stored in such a way that the source privacy vault is not known to the community vault 218. Embodiments of the present invention are not limited to operating environments where the community vault application 218 and the privacy vault application 204 run on different computing devices. For example, in a cloud computing environment, the community vault application 218 and the privacy vault application 204 may run on the same server. Whether running on the same or different devices, the data in the community vault application 218 and data in the privacy vault 204 are logically separated from each other so that the access to each others information may be controlled. The flow of information between the privacy vault 204 and the community vault application 218 is carefully controlled to ensure the privacy of the user's information is maintained and the user's privacy preferences are enforced.

The community vault 216 analyzes user data to generate segment rules for one or more user segments. The user segments express a user's interests. The segment rules are used to determine whether a user should be associated with a particular user segment. The segment rules may be generated by a statistical analysis of large groups of user data. For example, a statistical analysis of user data may result in a segment rule that states a user who viewed website X is also interested in product E.

Once segment rules are generated they may be shared with privacy vaults. In one embodiment, the community vault 218 shares segment rules with privacy vaults that did not share user data with the community vault 218. Thus, in one embodiment, the community vault 218 analyzes aggregate user data to generate segment rules and provides the segment rules to privacy vaults that did not provide user data. The privacy vault 204 does not have access to the aggregate user data used by the community vault 218 to generate the segment rules. Separating the collection and storage of user data that is used for aggregated analysis and segment rule generation, from the user specific data that is used to determine if a specific user should be associated with a specific segment, helps protect the privacy of the user. Increasing the protection of the user's privacy may encourage the user to share additional information they would not otherwise want to share.

The content server 220 stores media content and communicates it to a user upon receiving a request for the media. The content server 220 includes a computing device that may include a CPU, short-term memory, long-term memory, and one or more network interfaces. The network interface is used to connect to a LAN, WAN (including the Internet), or other variety of communications networks. The network interface to the WAN or LAN could be wired, wireless, or both. In one embodiment, the content server 220 facilitates transmission of media content (e.g. movies, web pages, videos, MP3s, advertisements, etc.) to laptop 202 or mobile device 206. The content server 220 transmits the media content over the packet-switched network 230. The content server 220 may also host web pages that are transmitted to a requesting device. Content server 220 may be affiliated with a content provider that produces, generates, or maintains the media content on the content server 220. In one embodiment, the content server 220 is an ad server.

Network 230 may include one or more mobile networks, one or more packet-based networks, including the Internet, and the public-switched telephone network ("PSTN"). The various components within network 230 may be owned and/or operated by multiple entities, commercial or otherwise. Network 230 is configured to transmit a variety of communication formats including phone calls, emails, text messaging, faxes, instant messaging, pages, voice mails, photographs, audio files, web pages, videos, movies, TV shows, calendar reminders, task reminders, advertisements, and other files containing communicative content.

Figure 3:
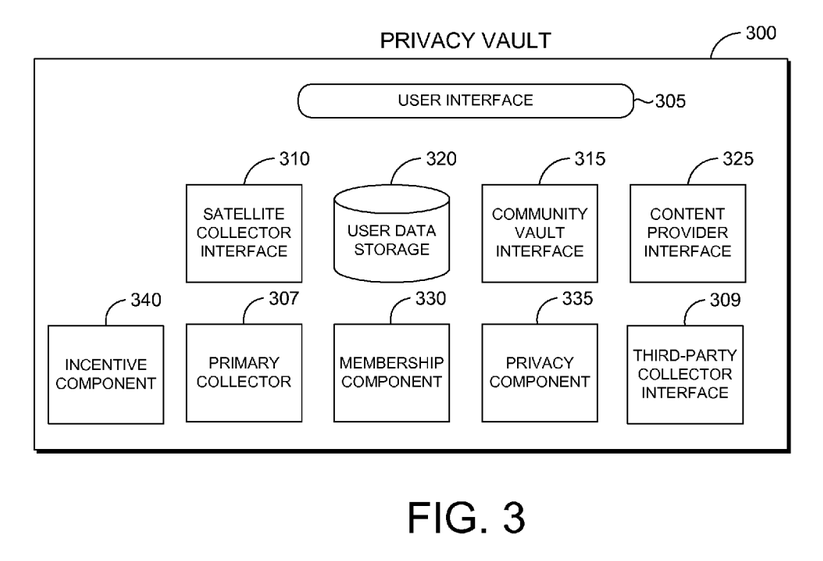
FIG. 3 is a block diagram of an exemplary computing system architecture of a privacy vault suitable for collecting user data and transmitting relevant user segments to content providers, in accordance with an embodiment of the present invention.

Turning now to FIG. 3, a block diagram of an exemplary computing system architecture of a privacy vault 300, which is suitable for collecting user data and transmitting relevant user segments to content providers is shown, in accordance with an embodiment of the present invention. The components shown in privacy vault 300 are exemplary in nature and correspond with major functions performed by the privacy vault 300. When privacy vault 300 is implemented in a computing program, the programming does not need to be broken into the components shown in FIG. 3. The programming may be broken into more or less components as desired.

In one embodiment, the privacy vault 300 operates on a computing device such as computing device 100 described previously with reference to FIG. 1. The computing device may be a laptop, desktop, Netbook, or other suitable computing device. The computing device may be associated with one or more users. Throughout the discussion of the privacy vault 300, the computing device is described as having a single user for the sake of simplicity. But, embodiments to the present invention are not limited to situations where the computing device on which the privacy vault 300 is operating is associated with only a single user.

The components shown within the privacy vault 300 include a user interface component 305, a primary collector 307, a third-party-collector interface 309, a satellite-collector interface 310, a user-data data store 320, the community-vault interface 315, the content-provider interface 325, the membership component 330, the privacy component 335, and an incentive component 340. The user interface component 305 displays a user interface through which a user may view data within the various components and adjust settings and preferences within the components. The settings allow the user to limit the user data communicated outside of the privacy vault 300 and restrict the information collected. Additional adjustable settings will be explained in more detail as the component impacted by settings is explained. The user interface component 305 may generate a user interface that is displayed on a display communicatively coupled to the computing device on which the privacy vault 300 is operating.

The privacy vault 300 operates within the privacy sphere of a particular user. The user is given control over the types of information shared with outside parties. The types of controls and limits placed on information will be described in more detail as each component is described. When a computer has multiple users, the privacy vault 300 segregates all user data and preferences between users. Whether the computer has one or more users, the user interface may use security, such as user IDs and passwords, to limit access to information in the privacy vault 300.

The primary collector 307 collects user data based on an analysis of the computing device on which the privacy vault 300 is operating. For example, the primary collector 307 may analyze and store a user's web browsing and other online activity. In addition, the primary collector 307 may analyze the user's usage of documents and other programs on the computing device. The primary collector may also collect demographic information for the user. In one embodiment, the user chooses to enter demographic information into the privacy vault for use in personalizing the user's online experience. The primary collector 307 will transmit user data to the user-data data store 320 for storage. In one embodiment, the primary collector 307 manipulates the user data before sending it to the user-data data store 320. In another embodiment, all collected user data is sent to the user-data data store 320 for analysis by other components.

The satellite-collector interface 310 receives user data from satellite collectors (not shown) operating on separate computing devices associated with the same user. For example, a satellite collector may be operating on a different laptop computer or a mobile phone associated with the user. The satellite-collector interface 310 receives the user data information and communicates it to the user-data data store 320 where it is stored.

The third-party-collector interface 309 receives information from third-party collectors. As described previously, the third-party collector may be associated with an entity that has information describing the user or the user's activities. An example of user information that may be collected by third parties includes information describing the user's purchases or other financial transactions. The third-party interface 309 receives the user data and transmits it to the user-data data store 320.

The user-data data store 320 is a computer storage media that may store information in the form of tables, databases, or other data structures suitable for storing the user data. The user-data data store 320 receives information from various information collectors. For example, the primary collector 307, the satellite-collector interface 310, and the third-party-collector interface 309 may each send user data to the user-data data store 320. Collectively, the information within the user-data data store 320 is hereinafter referred to as the user data. The user-data data store 320 may be accessed through the user interface presented by the user interface component 305 where the data may be viewed by a user to confirm that only data consistent with the user's privacy settings is being collected. The user may add or delete user data from the user-data data store 320. The user data includes, but not limited to, user activity data, user demographic data, and user interest data.

The privacy vault 300 may send user data to a community vault through the community vault interface 315. The user may adjust the settings on the content provider interface 325 such that no user data is shared with the community vault. The user may choose to limit certain data from being shared. This allows the user to locally control access to and use of their user data. In one embodiment, a community vault does not have access to the user data in the privacy vault. Similarly, in one embodiment, the privacy vault 300 does not have access to the aggregated user data in the community vault. Thus, the privacy vault 300 only has access to local user data.

A community vault analyzes user data to generate segment rules for user segments. The user segments express a user's interests. The segment rules are used to associate a user to an individual user segment based on the user's data. The segment rules may be generated by a statistical analysis of large groups of user data. For example, a statistical analysis of user data may indicate that users who viewed website X are also interested in product E. Or, more generally, users who viewed website W are interested in sports. Since the user data may include user activities as well as demographic data, the segment rule may be more specific such as a woman between the ages of 40 and 50 that purchased product X may also be interested in product Y.

In one embodiment, the community vault (not shown) uses differential privacy techniques to obscure information provided by an individual user. Differential privacy techniques include adding noise to a reply to a statistical query that is performed on the user data in the community vault. The noise is chosen carefully so that it masks replies (answers) that are small, but has minimal effect on replies (answers) that are large. When a small result is returned in reply to the query, adding a large number to the small result will make the result meaningless. For example, suppose the noise is between –100 to 100 and suppose that someone queried the user data to determine how many engineers living in a town with a very small population had visited website X, and received an answer that is a small number, for example 65. When protected by differential privacy with the noise of +/–100, the answer will be any number between zero and 165 (since the noise between –100 and 100 is added to the real answer of 65, which masks the real answer completely). Using differential privacy protects the privacy of individual users that submit data to the community vault.

While protecting individuals, differential privacy still allows a statistical analysis for statistically significant associations that can be used to form segment rules. For example, adding 100 to a query that would return a statistically significant result would not actually skew the results from a statistical point of view. For example, if 1,000,000 men between the ages of 20 and 40 visited site X, then adding any number between –100 and 100 to 1,000,000 would not make a statistical difference. In this way, the ability to query the data in the community vault to attempt to find meaningful correlations between activities and interests is possible while obscuring individual data. Other privacy protections may also be used in the community vault.

Once the community vault generates segment rules, the segment rules may be communicated back to the privacy vault 300 as well as similar privacy vaults operating on other computing devices associated with other users. As stated, the user may adjust the settings on the content provider interface 325 such that no user data is shared with the community vault. In this situation, the community vault may still send segment rules to the privacy vault 300 through the community vault interface 315. Thus, the privacy vault 300 may receive segment rules even if they contributed no user data. The segment rules may be stored in user-data data store 320 for later use by other components. In one embodiment, the user segments are encrypted and an encryption key is provided to the privacy vault by the community vault through the community vault interface 315. In one embodiment, the community vault also provides the encryption key to content providers that wish to utilize the user segments that were associated with a user by the privacy vault 300 using segment rules provided by the community vault.

The content provider interface 325 interfaces with one or more content providers such as ad servers. The content provider interface 325 may send a user segment that membership component 330 has determined the user to be associated with to a content provider. The user segment may include content rules that the content provider may use to select content for the user. In other embodiments, the content rules are provided to the content provider by the community vault. The content rules provided by the community vault may be associated with a user segment through a segment ID. The content provider may then select content based on the user segment and return it to the computing device on which the privacy vault 300 is operating. The content provider interface 325 may also receive a request for a user segment from a content provider upon the user accessing the content provider's web page. The content provider may also request a user segment in other situations where the user segment may be useful to the content provider. In one embodiment, the content provider offers the user an incentive, such as a cash-back bonus, when the user agrees to share user segments with which the user is associated. The incentive program may be tracked in the incentive component 340. Incentives may also be offered by the community vault to encourage the user to share additional information with the community vault. Any compensation offered by the community vault may be tracked by the incentive component 340.

The membership component 330 assigns user segments to the user of the privacy vault 300. The membership component 330 uses the segment rules associated with the user segment to assign a user segment to the user. In general, the segment rules indicate that a user should be associated with the user segment if the user's user data conforms with criteria within the segment rule. In one embodiment, the user may explicitly select user segments with which they wish to be associated. The user may also choose to view the user segments that the membership component 330 has assigned to the user. User segments associated with the user may also be deleted by the user. Thus, the user may override user segment assignments made by the membership component 330 by explicitly adding or removing user segments. The override may occur through a user interface generated by the user interface component 305.

The privacy component 335 controls the flow of data out of the privacy vault 300. The privacy component 335 may restrict the types of user data sent to the community vault. The privacy component 335 may also restrict the type of user segments sent to a content provider through the content provider interface 325. For example, the user may indicate that he/she is not to be associated with certain user segments available. In other words, the user is allowed to override the user segment selection made by membership component 330. The privacy component 335 may also allow the user to restrict the type of information that is collected by the various collectors. In one embodiment, the user needs to give explicit permission for any information to leave the privacy vault 300. In other words, the default settings in the privacy component 335 may prevent the sharing of user data without the user's permission. In one embodiment, entities may provide an incentive to the user to provide additional information to the community vault or content providers. For example, depending on the privacy settings, additional points may be added or cash-back granted if more lenient privacy standards are selected. This may allow the content providers to provide content that is more appealing to the users and result in the user entering into transactions with entities affiliated with the content provider. As described, the incentives may be tracked by the incentive component 340.

Figure 4:
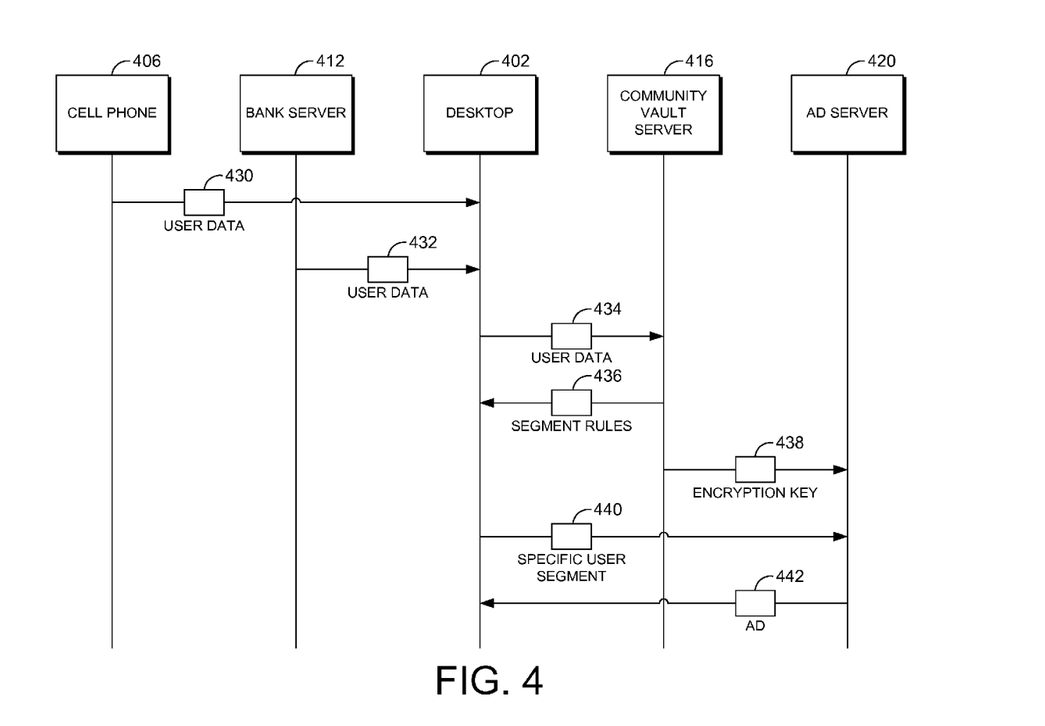
FIG. 4 is a chart showing communications occurring between various components during operation of a privacy vault and community vault, in accordance with an embodiment of the present invention.

Turning now to FIG. 4, a chart showing communications occurring between various components during operation of a privacy vault and community vault is provided, in accordance with an embodiment of the present invention. The privacy vault may be operating on a desktop computing device 402 and be similar to privacy vault 300 described previously. The various components through which communications occur include a cell phone 406, a bank server 412, a desktop computing device 402, a community-vault server 416, and an ad server 420. The cell phone 406 may be similar to the mobile device described previously with reference to FIG. 2. The bank server 412 may be similar to the third-party server 212 described previously with reference to FIG. 2. The desktop computer 402 may be similar to computing device 100 described previously with reference to FIG. 1. The community-vault server 416 may be similar to the community-vault server 216 described previously with reference to FIG. 2. The ad server 420 may be similar to the content server 220 described previously with reference to FIG. 2.

Initially, user data 430 is sent from a satellite collector (not shown) operating on the cell phone 406 to the privacy vault (not shown) operating on the desktop computer 402. Similarly, user data 432 is sent from a third-party collector operating on the bank server 412 to the privacy vault operating on the desktop 402. In addition to user data 430 and 432, the privacy vault operating on the desktop 402 may receive additional user data from a primary collector that collects data through analysis of activities taking place through the desktop computer 402. As explained previously, the combined user data from each source may be stored in a data store on the desktop computer 402.

Some portion of user data 434 is sent to the community-vault server 416 where it is received by a community-vault application (not shown). In one embodiment, the portion of user data 434 is raw user data that has not been altered by the privacy vault. In a different embodiment, the portion of user data 434 is a summary or average of the combined user data. The community-vault application uses the user data to generate segment rules. The portion of the user data 434 is combined with the user data provided by many other users to enable the community vault application to generate segment rules that are statistically significant and accurately represent a correlation between a user's activities and interests. The community-vault server 416 sends one or more segment rules 436 to the desktop computer 402. The one or more segment rules 436 may include every segment rule generated by the community vault or only segment rules 436 that the community vault determines might be relevant to the user of the desktop computer 402.

Next, the desktop 402 sends a specific user segment 440 to the ad server 420. The specific user segment 440 may be sent in response to a request from the ad server 420 which is not shown. In one embodiment, the specific user segment 440 is encrypted. The desktop computer 402 will have a decryption device so that the user segments may be utilized by the desktop computer 402. Similarly, an encryption key 438 may be sent to ad server 420 so that the user segment 440 may be utilized by the ad server to provide personalized content. In one embodiment, the ad server 420 pays for use of the encryption key. The ad server 420 may request the user segment upon having an opportunity to present an advertisement to the user. Upon receiving the user segment, the ad server 420 uses content rules within the user segment 440 to generate or select an advertisement that conforms with the content rules. In an alternative embodiment, the content rules are not embedded in the user segment 440, but sent to the ad server separately by the community vault 416. The content rules generally express the interests of the user associated with the user segment. For example, the content rule may state that the users associated with the specific user segment 440 are planning a trip to Canada.

Having selected an appropriate advertisement, the ad 442 is transmitted to the desktop computer 402. The ad 442 may also contain an incentive for the user to share the user segment 440. The communications shown in FIG. 4 are merely exemplary in nature. Various underlying details of the communications have been omitted for the sake of simplicity. In addition, other communications may occur as part of this process, such as acknowledgement messages and other protocol messages to set up communication sessions and so forth. These messages have also been omitted for the sake of simplicity.

Figure 5:
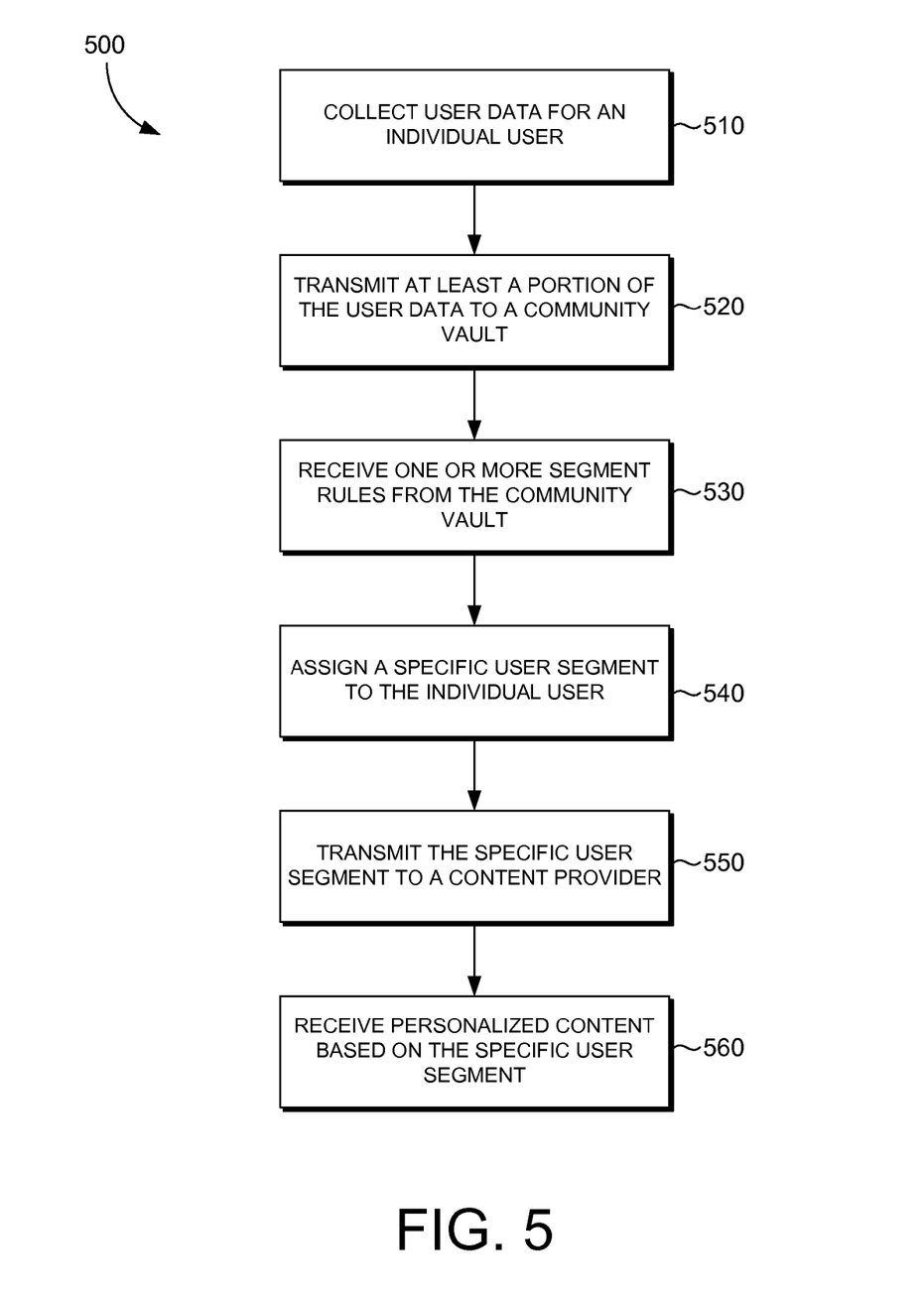
FIG. 5 is a flow chart showing a method of providing a personalized online experience in accordance with an embodiment of the present invention.

Turning now to FIG. 5, a method 500 of providing a personalized online experience is shown, in accordance with an embodiment of the present invention. An online experience includes an exchange information over a communications network that may be wired or wireless. The information may include advertisements, webpages, emails, instant messages, videos, etc. The online experience may occur through use of a computing device such as a laptop, cell phone, PDA, or the like. At step 510, user data for an individual user is collected. In one embodiment, the user data is collected by a primary collector on the computing device performing the method. The user data may also be received or collected from a satellite collector or third-party collector that is collecting information on a different computing device. Whether collected locally or remotely, the user data all describes a single individual user.

At step 520, some of the user data is transmitted to a community vault. A community vault receives a combination of user data from multiple users and generates segment rules based on the combination of user data. A user segment may be assigned to an individual user based on segment rules associated with the user segment and user data associated with the user. Segment rules indicate that the user segment should be associated with the user if the user has performed one or more activities, has certain demographic characteristics, and/or has explicitly provided an interest, as indicated by the user data. The user segment may include a user segment ID, a short description of the user segment, and content rules that allow a content provider to select content based on the user segment.

At step 530, one or more segment rules are received from the community vault. The segment rules may be received periodically as new segment rules are generated or old segment rules are updated. One or more user segments may be stored locally on the computing device operating the method. At step 540, a specific user segment is assigned to the individual user. The user segment is assigned to the user based on the segment rules associated with the user segment. The segment rules indicate that a user segment should be assigned to the user if the user is associated with particular user data. The user data may include both demographic information describing the user and the user's activities. The user activities may include online activities, such as browsing, website visits, and purchases. The user data may also include off-line activity, such as financial transactions, magazine subscriptions, and other information that may be relevant to a user's interests.

At step 550, a specific user segment is transmitted to a content provider. The user segment may be transmitted to the content provider in response to a request for the user segment received from the content provider. In one embodiment, the content provider is an ad server. At step 560, personalized content is received. The personalized content is based on a specific user segment. The personalized content may be an ad, but the personalized content may also be specific news articles, movies, songs, or other content that may appeal to the user based on information in the specific user segment.

The method may further include receiving an instruction from the individual user regarding limits on the user segments that may be transmitted to the content provider. When such an instruction is received, only user segments that conform with the instruction are sent to the content provider. In other words, the user may not be assigned a user segment that is restricted even if they would otherwise fit into the user segment.

Figure 6:
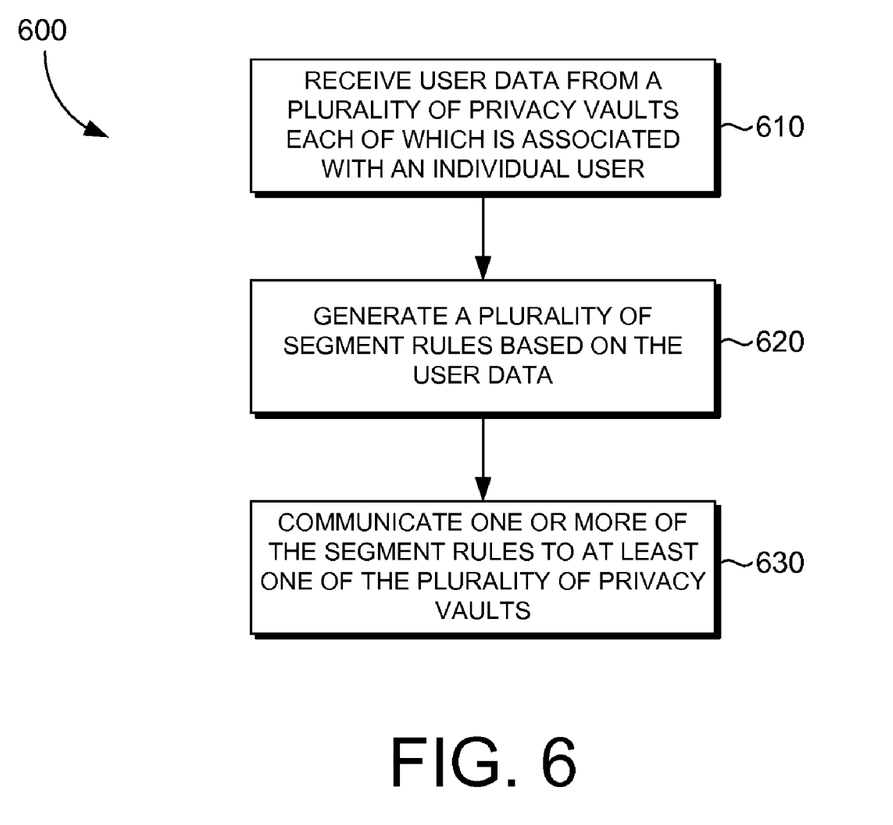
FIG. 6 is a flow chart showing a method of generating segment rules that are used to select a personalized content for an individual user in accordance with an embodiment of the present invention.

Turning now to FIG. 6, a method 600 of generating segment rules that are used to select a personalized content for an individual user is shown, in accordance with an embodiment of the present invention. Method 600 may be performed by a community-vault server that interacts with privacy vaults operating on multiple computing devices. At step 610, user data is received from a plurality of privacy vaults, each of which is associated with an individual user. As described previously, the user data may include user activities, user demographic information, and other information describing the user. At step 620, a plurality of segment rules are generated based on the aggregated user data. The segment rules may be generated by conducting a statistical analysis of the user data collected from the various privacy vaults. The segment rules indicate that a user that has associated with certain user data will have one or more particular interests.

At step 630, one or more of the plurality of segment rules are communicated to at least one of the plurality of privacy vaults. In one embodiment, the method also includes communicating one or more encrypted user segments for use with the segment rules to the privacy vaults. A decryption key may also be communicated to one or more content providers so that they may access the encrypted user segments.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more tangible computer-readable media having computer-executable instructions embodied thereon for performing a method of providing a personalized online experience, the method comprising: collecting, at a computing device, user data for an individual user; transmitting at least a portion of the user data to a community vault based on user privacy settings that define sharing limits of the user data, wherein the community vault receives a combination of user data from multiple users, wherein the community vault uses differential privacy to protect a source of the user data, such that user data applying to below a first threshold number of users is meaningless, while maintaining viability of user data applying to above a second threshold number of users, and wherein the community vault generates segment rules associated with user segments based on the combination of user data, wherein an individual user segment describes interests of a generic user associated with the individual user segment, and wherein a segment rule defines criteria that are used to determine whether the generic user belongs to the individual user segment, receiving one or more segment rules from the community vault; assigning a specific user segment to the individual user based on the one or more segment rules and the user data; communicating the specific user segment to a content provider; and receiving personalized content based on the specific user segment.

2. The media of claim 1, wherein the user data is received from one or more of an application running on the computing device, a mobile collector application running on a mobile device associated with the individual user, and a service collector operated by an entity providing a service to the individual user.

3. The media of claim 1, wherein the method further includes receiving an instruction from the individual user regarding limits on the user data that may be transmitted to the community vault.

4. The media of claim 1, wherein the method further includes receiving an instruction from the individual user regarding limits on the user segments that may be transmitted to the content provider.

5. The media of claim 1, wherein the specific user segment is encrypted by the community vault and is transmitted to the content provider with encryption intact.

6. The media of claim 1, wherein the one or more user segments include content rules used by content providers to determine if a particular content should displayed to a user associated with an individual user segment.

7. A method of generating segment rules for user segments that are used to select a personalized content for a user, the method comprising: receiving user data based on user privacy settings that define sharing limits of the user data from a plurality of privacy vaults associated with different individual users, wherein a source of the user data is protected using differential privacy, such that user data applying to below a first threshold number of users is meaningless, while maintaining viability of user data applying to above a second threshold number of users; generating, at a computing device, segment rules for a plurality of user segments based on the user data, wherein an individual user segment includes segment rules that are used to determine whether a user should be associated with a particular user segment, and wherein the individual user segment describes a user interest; and communicating one or more of the plurality of segment rules to at least one of the plurality of privacy vaults.

8. The method of claim 7, wherein the plurality of privacy vaults reside on client devices associated with the different individual users.

9. The method of claim 7, wherein the method further includes communicating one or more encrypted user segments to the at least one of the plurality of privacy vaults.

10. The method of claim 9, wherein the method further comprises communicating an encryption key for the one or more of the one or more encrypted user segments to a content provider, thereby allowing the content provider to utilize the one or more encrypted user segments to select relevant content for a user associated with the one or more user segments.

11. The method of claim 7, wherein an individual user segment includes a unique ID, a short readable description of the user individual segment, one or more segment rules used when determining whether a user belongs to the individual user segment, and a content rule that is used by a content provider to determine if a particular content should be displayed for a user associated with the individual user segment.

12. A computerized system for maintaining user privacy while facilitating a personalized online user experience for a user of the system; the system including: a privacy vault that runs on a computing device associated with the user, the privacy vault including; (1) a primary data collector that collects first-hand user data through analysis of user activities performed through the computing device; (2) a satellite data collector interface that receives supplemental user data collected by one or more satellite data collectors running on other computing devices associated with the user, wherein the first-hand user data and the supplemental user data is collectively referred to as user data; (3) a community vault interface for communicating the user data received based on user privacy settings that define sharing limits of the user data, and the supplemental user data to a community vault that operates on a different computer, wherein a source of the user data is protected using differential privacy, such that data applying to below a first threshold number of users is meaningless, while maintaining viability of user data applying to above a second threshold number of users and the community vault generates segment rules for one or more user segments based on the user data and additional user data associated with additional users; and (4) a segment distribution component that communicates a user segment that the privacy vault has determined to be associated with the user, to a content provider, wherein the content provider provides content based on the user segment.

13. The media of claim 12, wherein the privacy vault further comprises a third-party collector interface that provides third-party user data that includes information describing purchases made by the user, and wherein the third-party user data is also communicated to the community vault.

14. The media of claim 12, wherein the privacy vault further includes a membership component that determines into which user segments the user belongs in real time based on the one or more segment rules provided by the community vault.

15. The media of claim 12, wherein the privacy vault further includes a privacy management component that allows the user to do one or more of specify types of the user data that is shared with the community vault, specify which portion of the user data may be used by a membership component to determine into which user segments the user belongs, and specify which of the one or more user segments may be shared with content providers.

16. The media of claim 12, wherein the privacy vault further includes a user interface component that allows the user to view information in one or more components within the privacy vault and to adjust privacy settings associated with the one or more components.

17. The media of claim 12, wherein the user segment includes a unique ID, a short readable description of the user segment, segment rules used to determining whether a user belongs to the user segment, and a content rule that is used by the content provider to determine if a particular content should be displayed to a user associated with the user segment.

18. The media of claim 12, wherein the user segment is encrypted, and wherein the content provider decrypts the user segment with a decryption key provided by an entity associated with the community vault.

* * * * *